(12) United States Patent
Kudo et al.

(10) Patent No.: US 9,803,563 B2
(45) Date of Patent: Oct. 31, 2017

(54) FUEL SUPPLY APPARATUS

(71) Applicant: HONDA MOTOR CO., LTD., Tokyo (JP)

(72) Inventors: Hirotsugu Kudo, Wako (JP); Masayoshi Kawaguchi, Wako (JP); Hiroshi Chishima, Wako (JP); Kenji Shigetoyo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 827 days.

(21) Appl. No.: 13/907,973

(22) Filed: Jun. 3, 2013

(65) Prior Publication Data
US 2014/0007842 A1    Jan. 9, 2014

(30) Foreign Application Priority Data
Jul. 9, 2012    (JP) .................. 2012-154025

(51) Int. Cl.
*F02D 19/06*    (2006.01)
*F02M 69/00*    (2006.01)
*F02D 19/08*    (2006.01)

(52) U.S. Cl.
CPC ..... *F02D 19/0671* (2013.01); *F02D 19/0649* (2013.01); *F02D 19/081* (2013.01); *F02M 69/00* (2013.01); *Y02T 10/36* (2013.01)

(58) Field of Classification Search
CPC .......... F02D 19/0649; F02D 19/0671; F02D 19/081; F02D 33/00; F02D 19/0665; F02D 19/0602; F02M 69/00; F02M 37/0088; Y02T 10/36; B01D 35/005; F02B 3/06

USPC ..... 123/445, 548, 516, 304, 575; 210/321.6, 210/172.1; 701/102; 180/314; 222/210, 222/137

See application file for complete search history.

(56) References Cited

U.S. PATENT DOCUMENTS

| | | | | |
|---|---|---|---|---|
| 1,394,488 A | * | 10/1921 | French | C10G 7/00 196/103 |
| 3,678,661 A | * | 7/1972 | Davis | B01D 5/0012 55/322 |
| 3,688,755 A | * | 9/1972 | Grayson | F02M 13/06 123/1 A |
| 5,357,908 A | * | 10/1994 | Sung | F02M 1/165 123/179.8 |

(Continued)

FOREIGN PATENT DOCUMENTS

| | | | | |
|---|---|---|---|---|
| GB | 191504070 A | * | 0/1915 | C11B 1/10 |
| JP | 2003314380 A | * | 11/2003 | |

(Continued)

*Primary Examiner* — Sizo Vilakazi
*Assistant Examiner* — Brian Kirby
(74) *Attorney, Agent, or Firm* — Mori & Ward, LLP (57) ABSTRACT

A fuel supply apparatus includes a material fuel tank, a separator, a condenser, a first fuel tank, and a first storage device. The material fuel tank is to store a material fuel. The separator is to separate the material fuel supplied from the material fuel tank into a first fuel and a second fuel. The condenser is to condense the first fuel supplied from the separator through a primary-order recovery passage. The first fuel tank is to store the first fuel supplied from the condenser through a secondary-order recovery passage. The first storage device is provided in the secondary-order recovery passage to temporarily store the first fuel supplied from the condenser.

5 Claims, 4 Drawing Sheets (56) References Cited

U.S. PATENT DOCUMENTS

| | | | | |
|---|---|---|---|---|
| 5,367,264 A * | 11/1994 | Brabetz | G01R 27/2605 | 324/663 |
| 6,067,969 A * | 5/2000 | Kemmler | F02M 1/165 | 123/514 |
| 6,318,306 B1 * | 11/2001 | Komatsu | F02B 43/08 | 123/3 |
| 6,332,448 B1 * | 12/2001 | Ilyama | F02D 19/0605 | 123/304 |
| 6,378,489 B1 * | 4/2002 | Stanglmaier | F02B 1/12 | 123/304 |
| 6,571,748 B2 * | 6/2003 | Holder | F02M 1/165 | 123/3 |
| 6,622,664 B2 * | 9/2003 | Holder | F02M 1/165 | 123/3 |
| 6,694,955 B1 * | 2/2004 | Griffiths | F02M 25/089 | 123/509 |
| 6,711,893 B2 * | 3/2004 | Ueda | B01D 61/36 | 123/1 A |
| 6,972,093 B2 * | 12/2005 | Partridge | C10G 31/11 | 123/1 A |
| 7,013,844 B2 * | 3/2006 | Oda | F02B 51/00 | 123/3 |
| 7,107,942 B2 * | 9/2006 | Weissman | F02D 19/12 | 123/1 A |
| 7,389,751 B2 * | 6/2008 | Leone | F02D 19/0628 | 123/1 A |
| 7,803,275 B2 * | 9/2010 | Partridge | B01D 61/362 | 210/500.27 |
| 8,034,217 B2 * | 10/2011 | Ito | B01D 1/221 | 159/27.3 |
| 8,118,009 B2 * | 2/2012 | Pursifull | F02B 43/10 | 123/406.31 |
| 8,397,701 B2 * | 3/2013 | Lewis | F02D 19/084 | 123/1 A |
| 8,580,111 B2 * | 11/2013 | Partridge | B01D 61/36 | 123/3 |
| 2002/0185115 A1 * | 12/2002 | Capshaw | F02M 37/20 | 123/518 |
| 2005/0056262 A1 * | 3/2005 | Osanai | F02M 25/089 | 123/520 |
| 2007/0215125 A1 * | 9/2007 | Dearth | F02D 19/12 | 123/568.12 |
| 2009/0031996 A1 * | 2/2009 | Chung | F02M 31/20 | 123/518 |
| 2009/0114168 A1 * | 5/2009 | Lee | F02M 27/02 | 123/3 |
| 2009/0157277 A1 * | 6/2009 | Pursifull | F02B 43/10 | 701/102 |
| 2010/0155322 A1 * | 6/2010 | Partridge | B01D 61/362 | 210/321.6 |
| 2010/0269503 A1 * | 10/2010 | Lengert | F01K 25/04 | 60/645 |
| 2010/0282567 A1 * | 11/2010 | Sankaranarayanan | C10G 25/00 | 196/46 |
| 2011/0048026 A1 * | 3/2011 | Hoffjann | F02C 3/305 | 60/775 |
| 2012/0132577 A1 * | 5/2012 | Partridge | B01D 53/22 | 210/180 |
| 2012/0260892 A1 * | 10/2012 | Menke | B60K 15/03519 | 123/519 |
| 2013/0036990 A1 * | 2/2013 | Chishima | F02M 25/089 | 123/3 |
| 2013/0174808 A1 * | 7/2013 | Kudo | F02M 37/0064 | 123/445 |
| 2014/0007842 A1 * | 1/2014 | Kudo | F02D 19/0671 | 123/445 |

FOREIGN PATENT DOCUMENTS

| | | | |
|---|---|---|---|
| JP | 2004-522039 | | 7/2004 |
| JP | 2004-232624 | | 8/2004 |
| JP | 2009-144720 | | 7/2009 |
| WO | WO 02/077429 | * | 10/2002 |

* cited by examiner

FUEL SUPPLY APPARATUS

CROSS-REFERENCE TO RELATED APPLICATIONS

The present application claims priority under 35 U.S.C. §119 to Japanese Patent Application No. 2012-154025, filed Jul. 9, 2012, entitled "Fuel Supply Apparatus." The contents of this application are incorporated herein by reference in their entirety.

BACKGROUND OF THE INVENTION

Field of the Invention

The present disclosure relates to a fuel supply apparatus.

Discussion of the Background

A method to selectively supply a high octane fuel and a low octane fuel, which have been separated from material fuel, to an internal combustion engine has been proposed (see Japanese Unexamined Patent Application Publication (Translation of PCT Application) No. 2004-522039, Japanese Unexamined Patent Application Publication No. 2004-232624, and Japanese Unexamined Patent Application Publication No. 2009-144720).

A method to recover high octane fuel has been proposed, whereby the separated high octane fuel is condensed from a gas phase into a liquid phase by a condenser that is provided in the recovery passage, followed by storage in a high octane fuel tank (see Japanese Unexamined Patent Application Publication (Translation of PCT Application) No. 2004-522039, Japanese Unexamined Patent Application Publication No. 2004-232624, and Japanese Unexamined Patent Application Publication No. 2009-144720).

SUMMARY OF THE INVENTION

According to one aspect of the present invention, a fuel supply apparatus includes a material fuel tank, a separator, a condenser, a first fuel tank, and a first storage device. The material fuel tank is to store a material fuel. The separator is to separate the material fuel supplied from the material fuel tank into a first fuel and a second fuel. The first fuel contains a larger amount of high-octane component than an amount of high-octane component of the material fuel. The second fuel contains a larger amount of low-octane component than an amount of low-octane component of the material fuel. The condenser is to condense the first fuel supplied from the separator through a primary-order recovery passage. The first fuel tank is to store the first fuel supplied from the condenser through a secondary-order recovery passage. The first storage device is provided in the secondary-order recovery passage to temporarily store the first fuel supplied from the condenser.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Configuration

Figure 1:
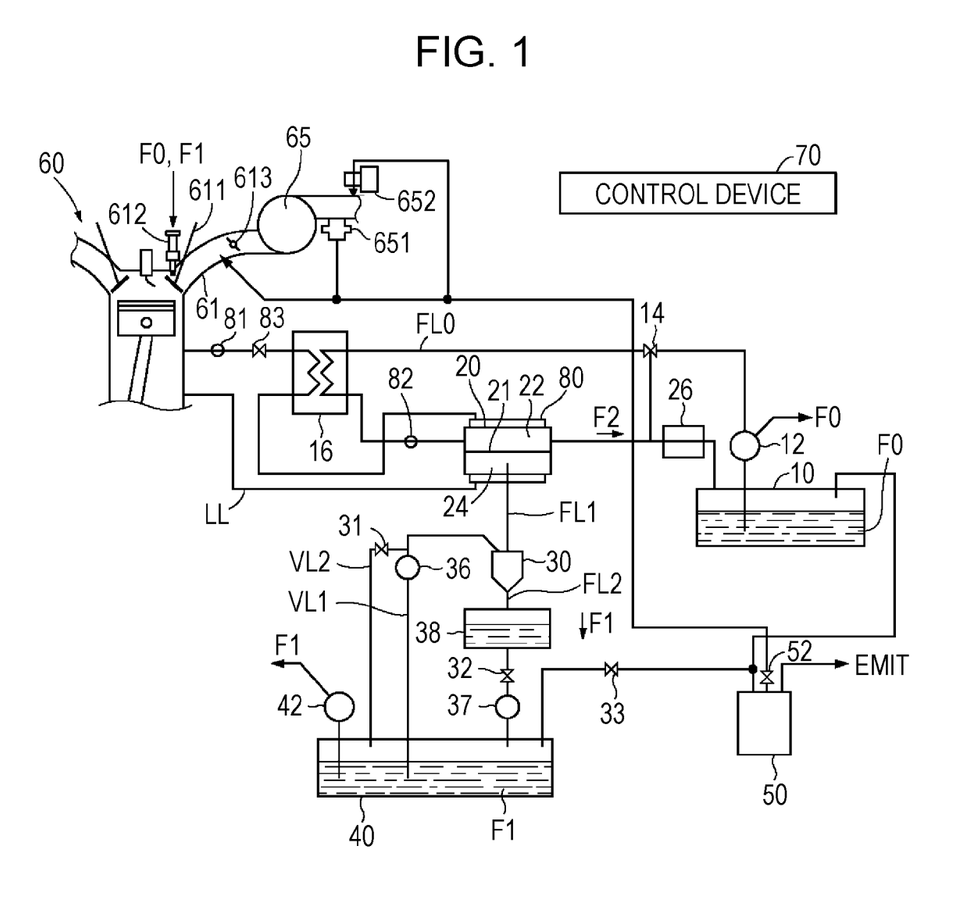
FIG. 1 is a configuration description diagram of a fuel supply apparatus as an embodiment of the present disclosure.

The fuel supply apparatus illustrated in FIG. 1 has a material fuel tank 10, a separator 20, condenser 30, first fuel tank 40, canister 50, and control apparatus (or ECU (electronic control unit)) 70. The fuel supply apparatus is mounted on a vehicle, and configured so as to supply fuel as to an internal combustion engine 60 that is also mounted on the vehicle.

Normal or commercial gasoline supplied via a fill opening is stored as material fuel F0 in the material fuel tank 10. The material fuel F0 stored in the material fuel tank 10 is supplied as to the internal combustion engine 60 after being pressurized up to a specified pressure by a high pressure feed pump 12 (unshown).

Also, upon being pressurized up to a specified pressure by the high pressure feed pump 12, and then heated by a heater 16, the material fuel F0 is transported into the separator 20. In the case that the material fuel tank 10 and the heater 16 are shut off by a three-way valve 14, the material fuel F0 is returned to the material fuel tank 10 via a radiator 26, without traveling via the separator 20. The heater 16 is made up of a heat exchanger that causes heat exchange of the cooled water of the internal combustion engine 60 and the material fuel. Instead of or in addition to the heat exchanger, the heater 16 may be made up of an electric heater.

The material fuel F0 stored in the material fuel tank 10 evaporates, whereby fuel vapor V, which contains hydrocarbons and ethanol, is generated. The fuel vapor V is supplied from the material fuel tank 10 as to the canister 50.

The separator 20 is configured so as to separate the material fuel F0 into a first fuel F1 and second fuel F2 by pervaporation (PV). The separator 20 has a separation membrane 21 which allows selective permeation of the high-octane components in the material fuel (gasoline), and a high pressure chamber 22 and low pressure chamber 24 that are separated by the separation membrane 21 (unshown).

The first fuel F1 is a high octane fuel having a greater amount of high octane components than does the material fuel F0, and is an alcohol such as ethanol, for example. The second fuel F2 is a low octane fuel having a lesser amount of high octane components that does the material fuel F0.

Specifically, while material fuel F0 that is in a high temperature and high pressure state is supplied as to the high pressure chamber 22 of the separator 20, the low pressure chamber 24 is maintained in a non-pressure state, whereby the high octane components included in the material fuel F0 permeates the separation membrane 21 and leaks into the low pressure chamber 24. Upon the amount of high octane components of material fuel F0 increasing, the octane value of the permeation fluid increases, whereby the first fuel F1, which includes a large amount of high octane components and which has a higher octane value than the material fuel F0, may be recovered from the low pressure side of the separation membrane 21.

On the other hand, the amount of high octane components included in the material fuel F0 that flows through the high pressure chamber 22 decreases more the farther downstream it goes, whereby the second fuel F2, which has a small amount of high octane components and which has a lower octane value that the material fuel F0, remains in the high pressure chamber 22. Upon being cooled in the radiator 26, the second fuel F2 that has flowed out of the separator 20 is supplied as to the material fuel tank 10.

Also, the temperature of the separation membrane 21, temperature and supply amount of the material fuel F0, and action conditions of the separator 20 such as pressure in the high pressure chamber 22 and pressure (negative pressure) of the low pressure chamber 24, are controlled. Thus, the separation speed or recovery amount or the like of the first fuel F1 and second fuel F2 by the separator 20 may change.

For example, the temperature of the material fuel F0 supplied to the separator 20 is controlled by the heater 16, whereby the temperature of the separation membrane 21 can be adjusted. Further, pressure in the low pressure chamber 24 can by adjusted according to a decrease in pressure of the condenser 30, by operations of the vacuum pump 36.

Note that the second fuel F2 may be stored in a second fuel tank (unshown), which is separate from the material fuel tank 10, after being supplied as to the second fuel tank. Also, the second fuel F2 stored in the second fuel tank, instead of material fuel F0, may be supplied as to the internal combustion engine 60.

The condenser (negative pressure tank) 30 is provided midway in the recovery passage that connects the low pressure chamber 24 of the separator 20 and the first fuel tank 40, and is configured so as to condense the first fuel F1. The condenser 30 is made up of an air-cooled or water-cooled tank or a reservoir.

The condenser 30 is connected to the suction side of the vacuum pump (negative pressure pump) 36. The inner side of the condenser 30 is controlled to be in a negative pressure state by operations of the vacuum pump 36, and becomes a lower pressure state than the vapor pressure of the first fuel F1. The fuel vapor V, which contains hydrocarbons and ethanol generated by the vaporization of the first fuel F1, is supplied to the first fuel tank 40 by the operations of the vacuum pump 36. A pressure sensor (unshown) to measure the internal pressure PC is provided to the condenser 30.

The first buffer tank (first reservoir) 38 is provided midway in the second recovery passage FL2 which connects the condenser 30 and first fuel tank 40, and is configured so as to store the first fuel F1 in liquid phase which has been condensed by the condenser 30. For example, the first buffer tank 38 is made up of an air-cooled or water-cooled tank. A storage amount sensor (unshown) to measure the amount of first fuel F1 stored in the inner portion of the first buffer tank 38 is provided thereto.

In the second recovery passage FL2, a second switching mechanism 32 and delivery pump 37 are provided on the downstream side of the first buffer tank 38. The second switching mechanism 32 is configured so as to open and close the second recovery circuit. The delivery pump 37 is configured so as to deliver the first fuel F1 stored in the first buffer tank 38 to the first fuel tank 40. A jet pump, for example, may be employed as the delivery pump 37.

The second recovery passage FL2 is opened and closed by the action and stopping action of the delivery pump 37, whereby the second switching mechanism 32 to open and close the second recovery passage FL2 may be omitted.

The condenser 30 and first fuel tank 40 are connected by a first fuel vapor passage VL1 which is separate from the second recovery passage FL2. The vacuum pump 36 is provided to the first fuel vapor passage VL1. The vacuum pump 36 operates, by which the fuel vapor V is guided from the condenser 30 to the first fuel F1 stored in the first fuel tank 40.

The first fuel vapor passage VL1 is connected to the first fuel tank 40, through the second fuel vapor passage VL2 which is branched from the upstream side of the vacuum pump 36. The first switching mechanism 31 is provided to the second fuel vapor passage VL2. By the first switching mechanism 31 being opened, the fuel vapor V that is filling the first fuel tank 40 is guided into the condenser 30 through the second fuel vapor passage VL2 and first fuel vapor passage VL1.

The first fuel F1 that has been separated from the material fuel F0 by the separator 20 is stored in the first fuel tank 40. The first fuel F1 stored in the first fuel tank 40 is supplied as to the internal combustion engine 60, after the pressure thereof is increased up to a specified pressure by the high pressure feed pump 42.

The first fuel F1 stored in the first fuel tank 40 is vaporized, whereby the fuel vapor V that includes an alcohol such as ethanol or the like is generated. The first fuel tank 40 and canister 50 are connected, and a third switching mechanism 33 is provided to the connection passage. The third switching mechanism 33 is opened, whereby the fuel vapor V is supplied from the first fuel tank 40 as to the canister 50, through the connection passage.

A pressure sensor (unshown) to measure the internal pressure of the first fuel tank 40 is provided thereto. The switching mechanisms 31 through 33 are made up of electromagnetic valves, for example.

An adsorbent material such as activated charcoal is housed within the canister 50, and hydrocarbons, as well as alcohol included in the fuel vapor V from the material fuel F0, are adsorbed to the adsorbent material. Thus, the fuel vapor V may be separated into alcohol and hydrocarbons, and other components such as nitrogen or the like.

The air which includes separated nitrogen or the like is emitted to the outside of the vehicle from the canister 50. On the other hand, upon the internal combustion engine 60 operating and the vacuum tube 61 becoming in a negative pressure state, the alcohol and hydrocarbons adsorbed to the adsorbent material in the canister 50 are supplied to the vacuum tube 61 on the downstream side of the slot valve 613, and further is fired in a combustion chamber. A flow-adjustment valve 52 to adjust the flow of the fuel vapor V in a discharge passage, which is connected to the canister 50, is provided to the discharge passage.

The canister 50 may be configured to be heated by the condensation heat of the first fuel F1 that is generated in the condenser 30, so that the temperature thereof is maintained in a temperature range to sufficient for the adsorption capabilities of the fuel vapor V to be manifested. For example, a channel of cooling medium of the condenser 30 may be configured such that the canister 50 is heated by the cooling medium.

Functional configuration elements not described nor shown in the diagrams, such as a storage device or heat exchange device or the like, may be provided midway in the passages.

A vacuum valve 611, fuel injection device 612, and slot valve 613 are provided to the vacuum tube 61 which is connected to the firing chamber of the internal combustion engine 60. Upon the vacuum valve 611 being opened, the vacuum tube 61 and the firing chamber are connected to each other, while upon the vacuum valve 611 being closed, the vacuum tube 61 and the firing chamber are shut off from one another. The slot valve 613 is configured so as to adjust the amount of suctioned air of the internal combustion engine 60.

The fuel injection device 612 is disposed between the vacuum valve 611 and slot valve 613, and is configured so that one of the material fuel F0 and first fuel F1 is selectively injected as to cylinders in the internal combustion engine 60. Note that the fuel injection device 612 may be configured so that both the material fuel F0 and first fuel F1 simultaneously are injected into the cylinders of the internal combustion engine 60 at a specified combination ratio. Alternatively, the fuel injection device 612 may be configured so that the material fuel F0 and first fuel F1 are separately injected. A gas mixture of the air that is suctioned into the vacuum tube 61 and the fuel that is injected from the fuel injection device 612 is introduced from the vacuum tube 61 into the fuel chamber of the cylinders.

In the case that a second fuel tank is provided, the fuel injection device 612 may be configured so that one of the first fuel F1 and second fuel F2 is selectively injected, or both are simultaneously injected at a specified mixture ratio, as to the cylinders of the internal combustion engine 60.

A turbo charger 65, Venturi gas mixer 651, and purge pump 652 are provided at the upstream side of the slot valve 613. The fuel vapor V may be supplied from the canister 50 to the vacuum tube 61 via the purge pump 652 and turbo charger 65.

Note that the internal combustion engine 60 may be a natural suction engine rather than an engine with a turbo charger 65. In this case, the fuel vapor V may be supplied from the canister 50 as to the vacuum tube 61 on the downstream side of the slot valve 613, via a purge control valve (unshown).

Further, the fuel vapor V may be directly supplied from the condenser 30 to the vacuum tube 61 by the Venturi gas mixer 651. Also, the fuel vapor V may be directly supplied from the first fuel tank 40 as to the vacuum tube 61 of the internal combustion engine 60.

The fuel supply device further has a cooling medium circulation line LL to circulate a cooling medium (for example, water) to cool the internal combustion engine 60. A pump (unshown) to circulate a cooling medium through the cooling medium circulation line LL is provided to the cooling medium circulation line LL. The cooling medium circulation line LL is configured so as to cause heat exchange between the cooling medium and the material fuel F0 flowing through a material fuel passage FL0, at the heater 16 downstream from the internal combustion engine 60. The cooling medium circulation line LL is further configured so as to cause heat exchange between the cooling medium and separator 20 downstream from the heater 16. Note that the cooling medium circulation line LL may be configured so as not to connect via the heater 16.

Upon being heated by the heat exchange with the internal combustion engine 60, the cooling medium that circulates through the cooling medium circulation line LL is cooled by the heat exchange with the material fuel F0 in the heater 16, and further is cooled by the heat exchange with the separator 20 and is heated again by the internal combustion engine 60. That is to say, upon cooling the internal combustion engine 60, the cooling medium that circulates through the cooling medium circulation line LL heats the material fuel F0 flowing through the material fuel passage FL0 at the heater 16, further heats the separator 20, and again cools the internal combustion engine 60. The separator 20 is heated by the cooling medium, whereby the temperatures of the separation membrane 21 within the separator 20 and material fuel F0 are indirectly maintained at appropriate temperatures from the perspective of maintaining the separation capability of the material fuel F0 by the separator 20 in a desired state.

In order to cause heat exchange between the cooling medium and separator 20, a portion of the cooling medium circulation line LL may be configured with a water jacket 80 that is attached to the outer side of the separator 20, for example.

The water jacket 80 has a water jacket entry for the cooling medium to flow into the inner portion thereof, and a water jacket exit for the cooling medium to flow out of the inner portion thereof (unshown).

The control device 70 is configured with a programmable computer. Output signals of various types of sensors to detect various states of the fuel supply device, such as a pressure sensor that outputs signals according to the internal pressure P of the condenser 30, are input into the control device 70. The control device 70 is programmed so as to execute a later-described "first fuel recovery control process". The control device 70 is also programmed so as to execute fuel injection control and ignition timing control of the internal combustion engine 60, as well as adjustment to operation conditions of the separator 20, adjustment to the fuel that is supplied as to the internal combustion engine 60, computing processing for pump operation control and adjustment to valve switching or valve opening and so forth.

The phrase "is programmed to" means that the computing processing device such as a CPU or the like, which is a configuration element of a computer, is configured to read out software as well as information needed from the memory such as ROM or RAM or a storage device, and to execute computation processing according to the software as to the information thereof.

Function

The function of the fuel supply device according to the above described configuration will be described. Specifically, the "first fuel recovery control processing" is repeatedly executed according to the order to be described below. Now, the description will be made under the premise that a third switching mechanism 33 is in a closed state.

Figure 3:
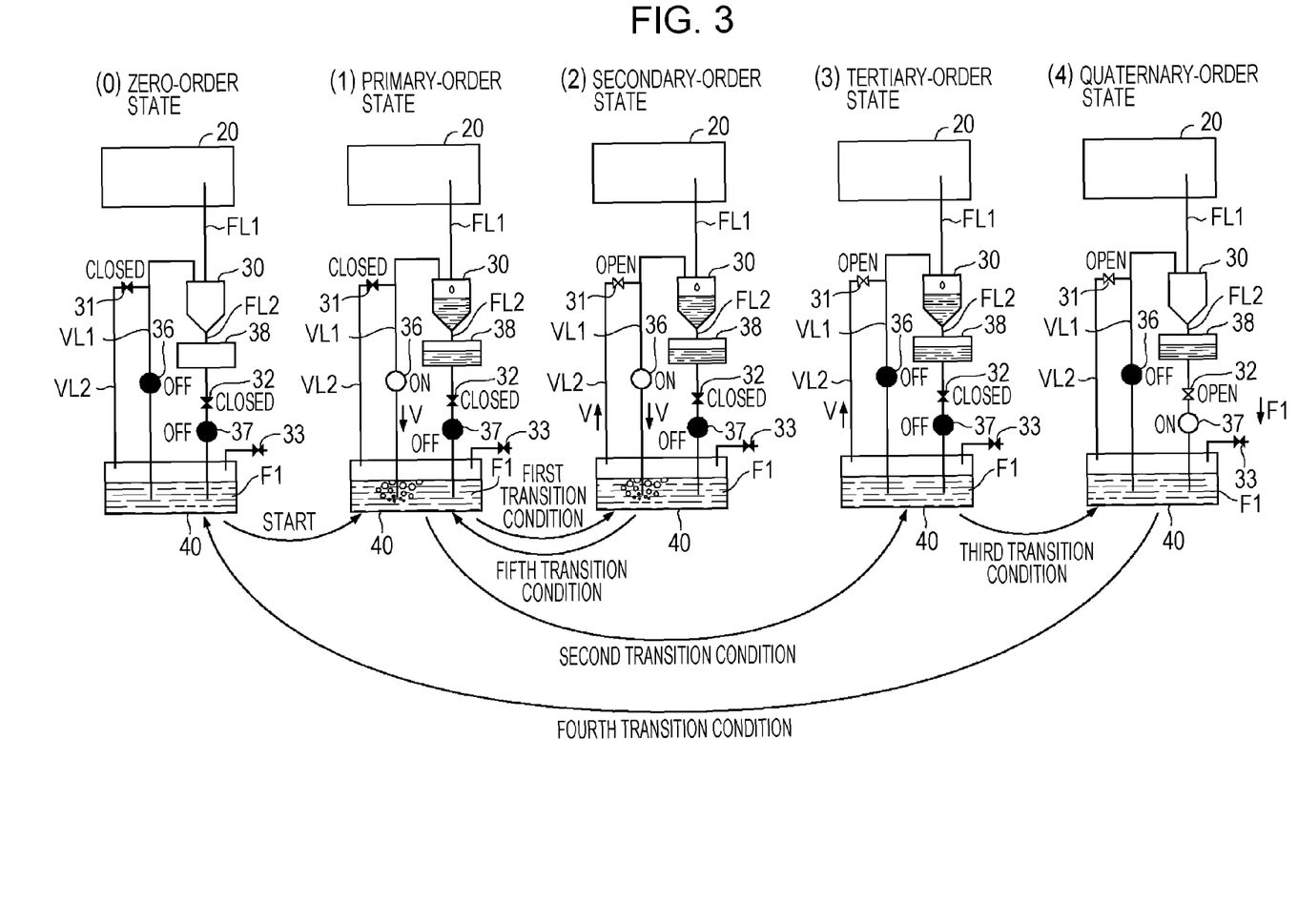
FIG. 3 is a description diagram relating to an switching process of the first fuel recovery control process.

Also, in an initialized state, the state of the fuel supply device is that of a zero-order state ((0) in FIG. 3), where a first switching mechanism 31 and second switching mechanism 32 are closed, and the vacuum pump 36 and delivery pump 37 are stopped. Also, let us say that initial values of a loop control variable S and time variable T are 0.

Figure 2:
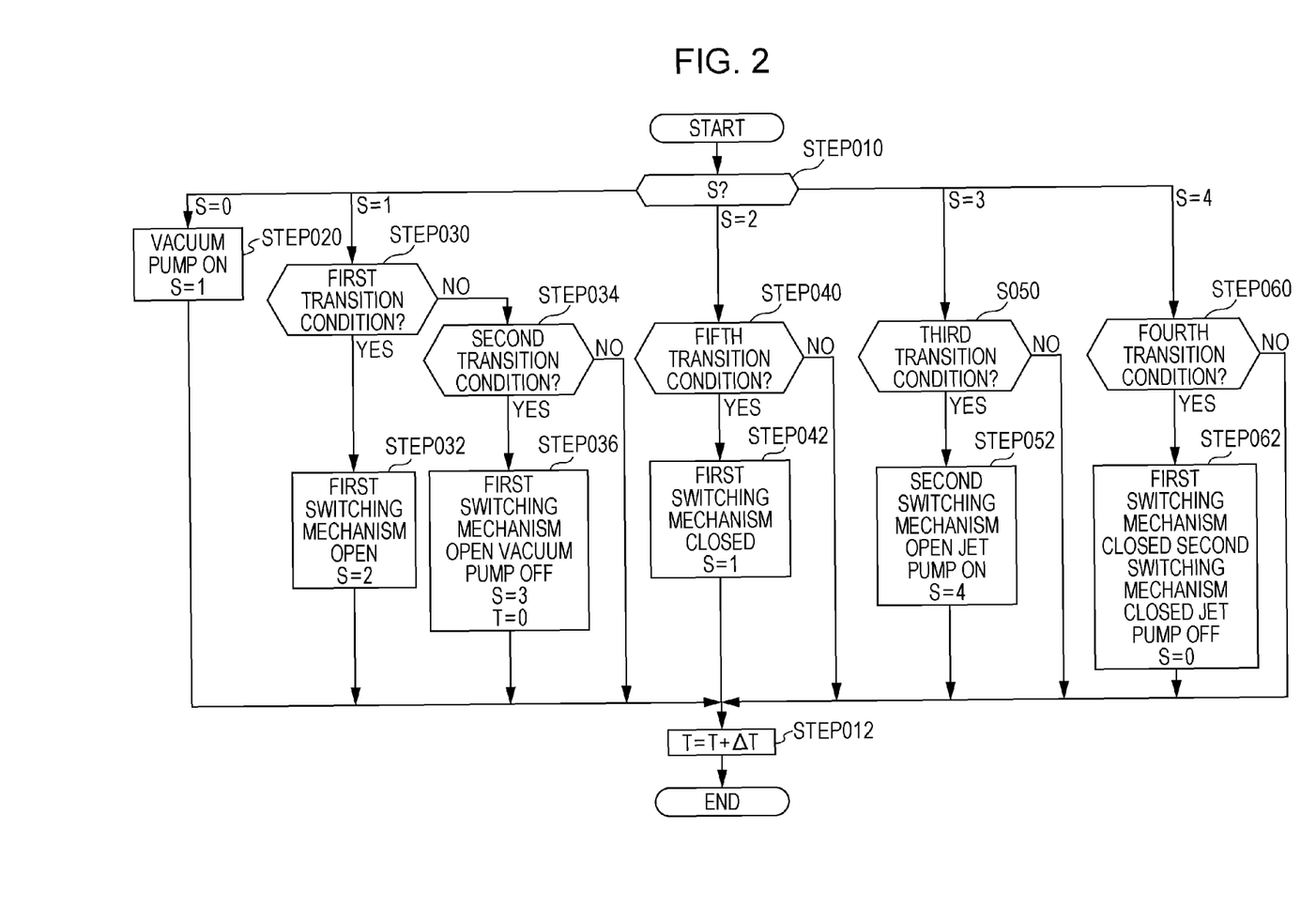
FIG. 2 is a flowchart describing a first fuel recovery control process.

First, the control device 70 determines the value of the loop control variable S which expresses the state of the fuel supply apparatus (FIG. 2/step 010).

In the case that the value of the loop control variable S is 0, (zero-order state ((0) in FIG. 3, (0) in FIG. 2/step 010), the control device 70 controls the vacuum pump 36 to turn to an active state, and sets the value of the loop control variable S to 1 (FIG. 2/step S020). Consequently, the state of the fuel supply device is transitioned from a zero-order state ((0) in FIG. 3) to a primary-order state ((1) in FIG. 3).

A primary-order state ((1) in FIG. 3) is a state in which the vacuum pump 36 is in an active state, the delivery pump 37 is in a stopped state, and the first switching mechanism 31 and second switching mechanism 32 are in a closed state.

In a primary-order state ((1) in FIG. 3), the condenser 30 is decompressed by the operation of the vacuum pump 36, and the internal pressure PC thereof gradually decreases. Also, the low pressure chamber 24 within the separator 20 is also decompressed, whereby fuel separation is started, and the first fuel F1 is gradually stored in the condenser 30 and first buffer tank 38.

In FIG. 2/step 010, in the case that the value of the loop control variable S is 1 (primary-order state ((1) in FIG. 3), 1 in FIG. 2/step 010), the control device 70 determines whether or not the first transition condition has been satisfied (FIG. 2/step 030).

A first transition condition to be utilized may be, for example, a condition where the pressure PC of the condenser 30 is at or above a predetermined pressure P1, a condition where the amount of time passed from the time that the value of the loop control variable S is 1 (the time that the state of the fuel supply device transitioned to the primary-order state) is at or above a predetermined first executing time T1, or a condition that is a combination thereof.

In the case that the determination result is positive (YES in FIG. 2/step 030), the control device 70 controls the first switching mechanism 31 to be in an open state, and sets the value of the loop control variable S to 2 (FIG. 2/step 032). In this case, the state of the fuel supply device is transitioned from the primary-order state ((1) in FIG. 3) to the secondary-order state ((2) in FIG. 3). A secondary-order state ((2) in FIG. 3) is a state in which the vacuum pump 36 is in an active state, the delivery pump 37 is in a stopped state, the first switching mechanism 31 is in an open state, and the second switching mechanism 32 is in a closed state.

In the first state ((1) in FIG. 3), the condensed liquid is pooled in the vacuum pump 36, whereby the capability of the vacuum pump 36 is decreased and the internal pressure PC of the condenser 30 is increased, and therefore the separation capability may be decreased. Thus, the present embodiment is configured, in order to recover from this state, such that temporarily the state is transitioned to the secondary-order state ((2) in FIG. 3).

In the secondary-order state ((2) in FIG. 3), the first switching mechanism 31 is in an open state, whereby the condensed fluid pooled in the vacuum pump 36 is expelled. Upon the condensed liquid being expelled, the capability of the vacuum pump 36 is recovered, and consequently the internal pressure PC of the condenser 30 is lowered (recovered).

In the case that the determination result is negative (NO in FIG. 2/step 030), the control device 70 determines whether or not the second transition condition is satisfied (FIG. 2/step 034).

The second transition condition to be utilized may be, for example, a condition where a stored amount BL of the first fuel F1 stored in the first buffer tank 38 is at or greater than a predetermined first storage amount L1, a condition where the amount of time passed from the time that the value of the loop control variable S is 1 (the time that the state of the fuel supply device transitioned to the primary-order state) is at or above a predetermined second executing time T2, or a condition that is a combination thereof.

In the case that the determination result is positive (YES in FIG. 2/step 034), the control device 70 stops the action of the vacuum pump 36, controls the first switching mechanism 31 to be in the open state, and sets the value of the loop control variable S to 3 and the value of the time variable T to 0 (FIG. 2/step 036). The time variable T is a positive variable to which ΔT is added after the processing, and for example, the control device 70 may be able to measure the amount of time passed by checking the value of the time variable T.

In this case, the state of the fuel supply device is transitioned from the primary-order state ((1) in FIG. 3) to a tertiary-order state ((3) in FIG. 3). A tertiary-order state ((3) in FIG. 3) is a state in which the vacuum pump 36 and delivery pump 37 are in a stopped state, the first switching mechanism 31 is in an open state, and the second switching mechanism 32 is in a closed state. In a tertiary-order state, fuel vapor V flows from the first fuel tank 40 to the condenser 30, and the internal pressure PC of the condenser 30 is elevated. Accordingly, fuel separation in the separator 20 is stopped.

In FIG. 2/step 010, in the case that the value of the loop control variable S is 2 (secondary-order state ((2) in FIG. 3) and 2 in FIG. 2/step 010), the control device 70 determines whether or not a fifth transition condition is satisfied (FIG. 2/step 040).

A fifth transition condition to be utilized may be, for example, a condition where the internal pressure PC of the condenser 30 is at or below a predetermined third pressure P3, a condition where the amount of time passed from the time that the value of the loop control variable S is 2 (the time that the state of the fuel supply device transitioned to the secondary-order state ((2) in FIG. 3) is at or above a predetermined third executing time T3, or a condition that is a combination thereof. Now, it is favorable for the third pressure P3 to be a lower pressure than the first pressure P1.

In the case that the determination result is positive (YES in FIG. 2/step 040), the control device 70 controls the first switching mechanism 31 to the closed state, and sets the value of the loop control variable S to 1 (FIG. 2/step 042). In this case, the state of the fuel supply device is transitioned from the secondary-order state ((2) in FIG. 3) to the primary-order state ((1) in FIG. 3), and the first fuel recover process is continued.

In FIG. 2/step 010, in the case that the value of the loop control variable S is 3 (tertiary-order state ((3) in FIG. 3) and 3 in FIG. 2/step 010), the control device 70 determines whether or not the third transition condition is satisfied (FIG. 2/step 050).

A third transition condition to be utilized may be, for example, a condition where the amount of time passed from the time that the time variable T is 3 (the time that the state of the fuel supply device transitioned to the tertiary-order state) is at or above a predetermined fourth executing time T4, a condition where the internal pressure PC of the condenser 30 is at or above a predetermined second pressure P2, or a condition that is a combination thereof. Now, the second pressure P2 is a pressure that is higher than the first pressure P1.

In the case that the determination result is positive (YES in FIG. 2/step 050), the control device 70 controls the second switching mechanism 32 to the open state, controls the delivery pump 37 to the active state, and sets the value of the loop control variable S to 4 (FIG. 2/step 052). In this case, the state of the fuel supply device is transitioned from the tertiary-order state ((3) in FIG. 3) of the fuel supply device ((3) in FIG. 3) to a quaternary-order state ((4) in FIG. 3). A quaternary-order state ((4) in FIG. 3) is a state wherein the vacuum pump 36 is in a stopped state, the delivery pump 37 is in an active state, and the first switching mechanism 31 and second switching mechanism 32 are in an open state. In a quaternary-order state ((4) in FIG. 3), the first fuel F1 stored in the first buffer tank 38 is introduced in to the first fuel tank 40 through the recovery passage.

In FIG. 2/step 010, in the case that the value of the loop control variable S is 4 (quaternary-order state ((4) in FIG. 3) and 4 in FIG. 2/step 010), the control device 70 determines whether or not a fourth transition condition is satisfied (FIG. 2/step 060).

A fourth transition condition to be utilized may be, for example, a condition where the storage amount BL of the first fuel F1 stored in the first buffer tank 38 is at or below a second storage amount L2 (e.g. 0), a condition where the amount of time passed from the time that the value of the loop control variable S is 4 (the time that the state of the fuel supply device transitioned to the quaternary-order state ((4) in FIG. 3)) is at or above a predetermined time, or a condition that is a combination thereof. It is favorable for the second storage amount L2 to be a storage amount that is lower than the first storage amount L1.

In the case that the determination result is positive (YES in FIG. 2/step 060), the control device 70 controls the first switching mechanism 31 and second switching mechanism 32 to the closed state, controls the delivery pump 37 to the stopped state, and sets the value of the loop control variable S to 0 (FIG. 2/step 062). Consequently, the state of the fuel supply device is transitioned from the quaternary-order state ((4) in FIG. 3) to the zero-order state ((0) in FIG. 3), and the recovery of the first fuel F1 is ended.

Further, in the case that fourth transition condition is satisfied, the control device 70 controls the second switching mechanism 32 to a closed state, and controls the delivery pump 37 to a stopped state, and may also control the vacuum pump 36 to an active state. In this case, instead of setting the value of the loop control variable S to 0, the control device 70 sets the loop control variable device S to 1. The state of the fuel supply device is transitioned from the quaternary-order state ((4) in FIG. 3) to the primary-order state ((1) in FIG. 3), and the recovery process of the first fuel F1 is continued.

In FIG. 2, following the processing of one of step 020, step 032, step 036, step 042, step 052, or step 062, or in the case that the determination result in step 034, step 040, step 050, or step 060 is negative, the time variable T is increased by ΔT (FIG. 2/step 012).

Following the above-mentioned processing, the control device 70 ends the current cycle of "first fuel recovery control processing" and starts the next cycle of "first fuel recovery control processing".

Also, during execution of the "first fuel recovery control processing", determination is made by the control device 70 as to whether or not the open condition of the first fuel tank 40 is satisfied. An "open condition" to be utilized may be, for example, a condition where the measurement pressure of the first fuel tank 40 is at or above a threshold value, a condition where there has been an acceleration request for a vehicle to exceed a threshold, or a condition that is a combination thereof.

In the case that the open condition is determined to have been satisfied, the third switching mechanism 33 is switched from a closed state to an open state, and a "quinary-order state" is realized where the passage linking the first fuel tank 40 and the canister 50 is open (unshown). In this event, for example, the first switching mechanism 31 and second switching mechanism 32 are controlled so as to be in a closed state. In a quinary-order state (unshown), the fuel vapor V is expelled from the first fuel tank 40 and adsorbed to the canister 50, and is supplied as to the internal combustion engine 60 through the vacuum tube 61, as necessary. The fuel vapor may be directly supplied as to the internal combustion engine 60. Thus, the usage efficiency of the fuel vapor V may be improved.

Advantages

According to the present disclosure, after starting the processing, the state of the fuel supply device is transitioned from a zero-order state ((0) in FIG. 3) to a primary-order state ((1) in FIG. 3) (FIG. 2/step 020).

In a primary-order state ((1) in FIG. 3), the first fuel F1 separated by the separator 20 is first condensed in the condenser 30 that is decompressed by the actions of the vacuum pump 36. The first fuel F1 that has been liquefied by condensation is supplied to the first buffer tank 38. The temperature of the first fuel F1 that is stored by the heat reduction in the first buffer tank 38 is decreased. Additionally, the fuel vapor V is introduced into the first fuel tank 40 from the condenser 30 by the vacuum pump 36, and at least a portion thereof is liquidized and stored in the first fuel tank 40 as the first fuel F1.

In the case that in the primary-order state ((1) in FIG. 3) the first transition condition is satisfied (YES in FIG. 2/step 030), the state of the fuel supply device is transitioned from a primary-order state ((1) in FIG. 3) to a secondary-order state ((2) in FIG. 3). Also, in the case that in the secondary-order state ((2) in FIG. 3) the fifth transition condition is satisfied (YES in FIG. 2/step 040), the state of the fuel supply device is transitioned from the secondary-order state ((2) in FIG. 3) to the primary-order state ((1) in FIG. 3).

Thus, by temporarily transitioning the state of the fuel supply device from the primary-order state ((1) in FIG. 3) to the secondary-order state ((2) in FIG. 3), the pressure PC of the condenser 30 recovers. By recovering the pressure PC of the condenser 30, the separating efficiency and condensing efficiency of the first fuel F1 may be improved.

In the case that in the primary-order state ((1) in FIG. 3) the second transition condition is satisfied (Yes in FIG. 2/step 034), the state of the fuel supply device is transitioned from the primary-order state ((1) in FIG. 3) to the tertiary-order state ((3) in FIG. 3). Thus, the first fuel tank 40 and the condenser 30 are linked, and the same pressurization thereof may be obtained.

In the case that in a tertiary-order state ((3) in FIG. 3) the third transition condition is satisfied (YES in FIG. 2/step 050), the state of the fuel supply device is transitioned to a quaternary-order state ((4) in FIG. 3). In a quaternary-order state ((4) in FIG. 3), the first fuel F1 is recovered by the actions of the delivery pump 37 ((4) in FIG. 3). In the case that in a quaternary-order state ((4) in FIG. 3) the fourth transition condition is satisfied (FIG. 2/step 060), the state of the fuel supply device is transitioned from the quaternary-order state ((4) in FIG. 3) to a zero-order state ((0) in FIG. 3). Thus, the current cycle of the "first fuel recover control process" is ended.

As described above, according to the fuel supply device of the present disclosure, the first fuel F1 does not have to be stored in the condenser 30 until the heat thereof is radiated, so condensing efficiency may be improved. Further, with the pressure controls by the actions of the vacuum pump 36 and the switching of the first switching mechanism 31, the separating efficiency and condensing efficiency of the first fuel F1 may be improved. Consequently, the recovery efficiency of the first fuel F1 improves.

Also, in the case that the open condition is satisfied, the fuel supply device is transitioned to a quinary-order state (unshown). Upon transitioning to a quinary-order state, the fuel vapor V is supplied from the first fuel tank 40 to the canister 50 through the opened third switching mechanism 33. The fuel vapor V is adsorbed by the canister 50, and the internal pressure of the first fuel tank 40 decreases. Consequently, the recovery efficiency by the adsorption of the fuel vapor V may be improved, and deterioration of the fuel tank by overloading may be inhibited.

Other Embodiments According to the Disclosure

Figure 4A:
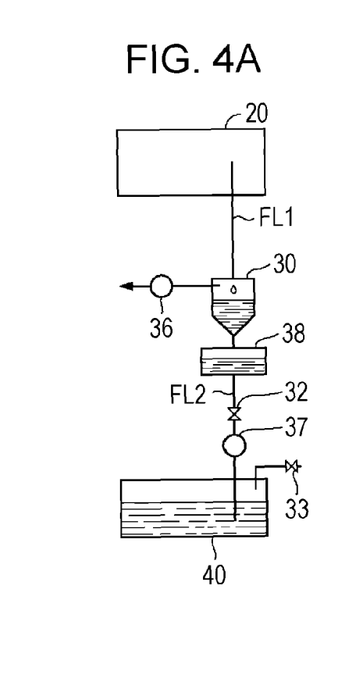
FIGS. 4A to 4D are description diagrams of another embodiment of the present disclosure.

As illustrated in FIG. 4A, the fuel supply device may be configured so that the emission end of the vacuum pump 36 is not the first fuel tank 40 but rather outside air. In this case, the first switching mechanism 31 and second fuel vapor passage VL2 are unnecessary.

Figure 4B:
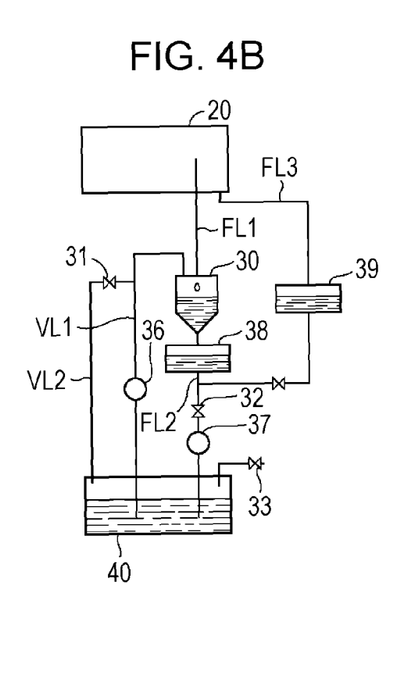

Also, as illustrated in FIG. 4B, a tertiary-order recovery passage FL3 such that connects to the downstream side of the first buffer tank 38 is provided in the secondary recovery passage FL2 from the low pressure chamber of the separator 20, and a second buffer tank (second storage unit) 39 which is separate from the first buffer tank 38 may be provided midway in the tertiary recovery passage FL3. In the present configuration, the first fuel F1 which has been converted to a liquid phase in the separator 20 may be introduced directly in the second buffer tank 39 without traveling via the condenser 30.

Note that in this case, the primary recovery passage FL1 is configured so as to recover the gas that has been introduced into the inner portion of the low pressure chamber 24 and has filled the low pressure chamber. Also, the tertiary recovery passage FL3 is configured so as to recover the first fuel that has been disposed on the floor face of the low pressure chamber 24 and liquefied.

The first fuel F1 that has been liquefied in the separator 20 is introduced directly into a buffer tank (storage unit), whereby the amount of processing of the condenser 30 may be reduced, and the processing efficiency of the condenser 30 may be improved.

Even in the case of providing multiple buffer tanks, "first fuel recovery control processing" may be performed. For example, in the event of transitioning from a tertiary-order state ((3) in FIG. 3) to a quaternary-order state ((4) in FIG. 3), a switching mechanism provided on the passage that links the second buffer thank 39 and first fuel tank 40 is in an open state, and the first fuel F1 may be recovered from the first buffer tank 38, while the first fuel F1 may be recovered simultaneously from the second buffer tank 39.

Also, a temperature sensor may be attached to a first buffer tank 38, so that the state of the fuel supply device does not transition to a quaternary-order state ((4) in FIG. 3) until the temperature measured by the temperature sensor is at or lower than a predetermined temperature, in FIG. 2/steps 050 through 052.

Further, the fuel supply device may be configured so as to perform cooling as to the first buffer tank 38 and condenser 30 with a cooling fan or a water-cooled or air-cooled cooling device.

Figure 4C:
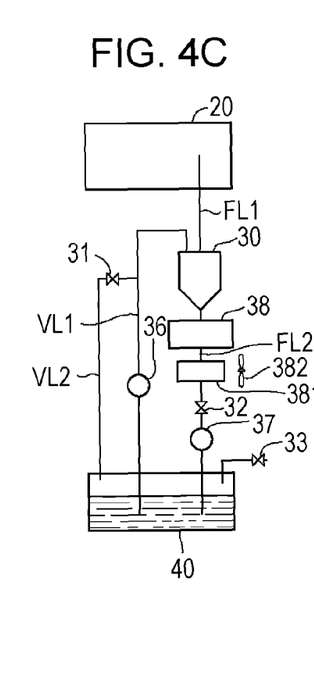

Also, as illustrated in FIG. 4C, the fuel supply device may have a cooling unit 381 that is configured so that the first fuel F1 is cooled by a cooling fan 382 downstream from the first buffer tank 38 in the secondary recovery passage FL2 and upstream from the first fuel tank 40. Thus, the temperature of the first fuel F1 that is supplied from the first buffer tank 38 to the first fuel tank 40 may be lowered.

Note that the second switching mechanism 32 and delivery pump 37 may be controlled so that, in the case that the temperature within the first buffer tank 38 is high, the amount of fuel supply of the first fuel F1 from the first buffer tank 38 to the first fuel tank 40 is reduced, or in the case that the temperature within the first buffer tank 38 is low, the amount of fuel supply of the first fuel F1 from the first buffer tank 38 to the first fuel tank 40 is increased. Thus, temperature control of the first fuel F1 supplied to the first fuel tank 40 may be performed more readily.

Figure 4D:
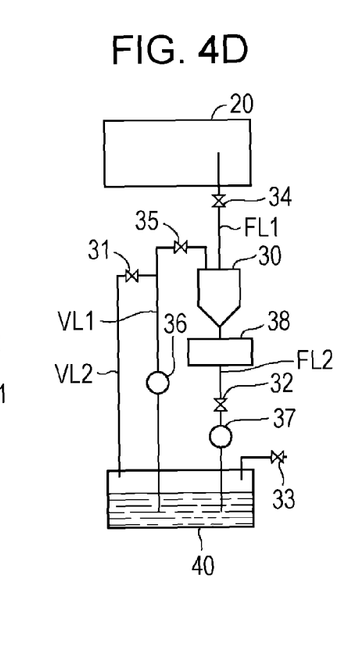

As illustrated in FIG. 4D, the fuel supply device may have a fourth switching mechanism 34 in the primary-order recovery passage FL1 and a fifth switching mechanism 35 that is downstream from the condenser 30 of the first fuel vapor passage VL1 and upstream from the vacuum pump 36.

In this case, instead of the primary-order state ((1) in FIG. 3), the fourth switching mechanism 34 may be closed and the fifth switching mechanism 35 opened, and rather than performing separation with the separator 20, just decompression of the condenser 30 may be performed. In such a case, in the case that the condenser 30 is sufficiently decompressed (the internal pressure of the condenser 30 is at or below a predetermined pressure), it is desirable to transition from the present state, to close the fifth switching mechanism 35 and open the fourth switching mechanism 34 to start separation in the separator 20.

Also, in the case that a fourth switching mechanism 34 is provided, in the event of transitioning from the primary-order state ((1) in FIG. 3) to the tertiary-order state ((3) in FIG. 3), the supply of first fuel F1 from the separator 20 to the condenser 30 may be immediately shut off by the fourth switching mechanism 34.

Also, a configuration may be made so that the pumps and switching mechanisms are not controlled by the control device 70, but the heat of the first fuel F1 is radiated by temporary storage in the first buffer tank 38.

Also, in a primary-order state ((1) in FIG. 3), in the case that the first transition condition is satisfied, a configuration may be made so as to transition from the primary-order state ((1) in FIG. 3) to the quaternary-order state ((4) in FIG. 3).

Also, the fuel supply device may be configured so as to not have a first switching mechanism 31 and second fuel vapor passage VL2. In this case, the fuel vapor V is supplied to the condenser 30 from the first fuel vapor passage VL1 or the secondary-order recovery passage FL2, thereby increasing the internal pressure of the condenser 30.

Also, in the quaternary-order state of the present disclosure, the first switching mechanism 31 is in the open state, but depending on the capability of the delivery pump 37, the first switching mechanism 31 may be in the closed state.

The embodiment of the present disclosure relates to a fuel supply device which supplies, to an internal combustion engine, selectively or simultaneously at a specified mixture ratio, a first fuel separated from a material fuel including more high octane components than the material fuel, and a second fuel separated from the material fuel including more low octane components than the material fuel or the material fuel.

The fuel supply device according to a first aspect of the embodiment includes a material fuel tank that stores the material fuel; a separator configured to separate the material fuel supplied from the material fuel tank into the first fuel and second fuel; a condenser configured to condense the first fuel that has been separated by the separator and supplied from the separator through a primary-order recovery passage; a first fuel tank configured to store the first fuel supplied from the condenser through a secondary-order recovery passage; and a first storage unit configured to temporarily store the first fuel supplied from the condenser, midway in the secondary-order recovery passage.

According to the first aspect of the embodiment, the material fuel is separated into a first fuel and a second fuel by a separator. The first fuel is supplied from the separator in a gas phase to a condenser through a primary-order recovery passage, and at least a portion thereof is transitioned to a liquid phase by condensation in the condenser.

Also, the first fuel that has been transitioned to a liquid phase is supplied to and stored in a first storage unit through a secondary-order recovery passage. By radiation of the stored first fuel, the temperature thereof is reduced.

The first fuel can be radiated by being stored in the first storage unit, whereby storage in the condenser is unnecessary. In the condenser, compared to the case of not having a first storage unit, more of the first fuel may be condensed. That is to say, the condensation efficiency of the first fuel in the condenser is improved.

Therefore, according to the first aspect, the condensation efficiency of the first fuel in the condenser is improved, whereby the recovery efficiency of the first fuel (high octane fuel) is improved.

The fuel supply device may have a second storage unit configured to temporarily store the first fuel that is liquefied by the separator and supplied through a tertiary recovery passage.

According to this configuration of the embodiment, the first fuel that is liquefied in the separator is supplied to a second storage unit without traveling via the condenser, so the supply amount to the condenser of first fuel that does not have to be condensed may be suppressed. Thus, the condensation efficiency of the first fuel in the condenser is further improved, whereby the recovery efficiency of the first fuel (high octane fuel) is further improved.

The fuel supply device according to the embodiment may have a vacuum pump that is provided to a first fuel vapor passage linking the condenser and the first fuel tank, and configured to suction and supply fuel vapor generated by the vaporization of the first fuel from the condenser as to a first fuel tank; and a control device configured to control the operations of the vacuum pump.

According to this configuration of the embodiment, the fuel vapor from the first fuel is suctioned from the condenser by the operations of the vacuum pump, and is then supplied as to the first fuel tank through the first fuel vapor passage. Corresponding thereto, at least a portion of the fuel vapor is transitioned from gas phase to liquid phase, and may be stored in the first fuel tank as the first fuel. Thus, in the event of decompression of the condenser, the fuel vapor is suppressed from being recovered and expelled outside the vehicle or the like in an unusable form, whereby the recovery amount of the first fuel is increased and the recovery efficiency of the first fuel (high octane fuel) is improved.

The fuel supply device according to the embodiment may have a flow adjustment mechanism configured to adjust the flow of the first fuel, downstream of the first storage unit in the secondary-order recovery passage and upstream of the first fuel tank; with the control device being configured to control the operations of the flow adjustment mechanism and the vacuum pump so that a primary-order state, in which the first storage unit and first fuel tank are shut off by the flow adjustment mechanism, and the condenser is decompressed by the operations of the vacuum pump, and a quaternary-order state, in which the flow amount of the first fuel is adjusted by the flow amount adjusting mechanism so that the first fuel is supplied from the first storage unit to the first fuel tank, and decompression of the condenser of the vacuum pump is stopped, may be realized, in sequence.

According to this configuration of the embodiment, the condenser is decompressed due to operation of the vacuum pump, by the control device, whereby a primary-order state in which fuel separation by a separator is performed and a quaternary state in which the first fuel is supplied from the first storage unit to the first fuel tank are realized in sequence. Consequently, the recovery efficiency of the first fuel (high octane fuel) is improved.

The fuel supply device according to the embodiment may have a first switching mechanism configured to switch a second fuel vapor passage that branches from the first fuel vapor passage on the upstream side of the vacuum pump and connects to the first fuel tank, with the control device being configured to control operations of the flow adjustment mechanism, first switching mechanism, and vacuum pump, so that the primary-order state is further a state in which the second fuel vapor passage is closed by the first switching mechanism; the quaternary-order state is further a state in which the second fuel vapor passage is opened by the first switching mechanism; a secondary-order state, in which the first storage unit and first fuel tank are shut off by the flow adjustment mechanism, the second fuel vapor passage is opened by the first switching mechanism, and the condenser is decompressed by the operations of the vacuum pump, is realized as a state temporarily transitioned from the primary-order state; and a tertiary-order state, in which the first storage unit and first fuel tank are shut off by the flow adjustment mechanism, the second fuel vapor passage is opened by the first switching mechanism, and decompression of the condenser of the vacuum pump is stopped, is realized as an intermediate state between the primary-order state and quaternary-order state.

According to this configuration of the embodiment, transition to the secondary-order state, in which the second fuel vapor passage is opened, during the primary-state, in which fuel separation at the separator is performed, is temporarily realized. Thus, the internal pressure of the condenser and separator can be lowered reliably, and the separation efficiency of the separator is improved. Also, a tertiary-order state, in which the second fuel vapor passage is opened, is realized between the primary-order state in which fuel is separated and the quaternary-order state in which the fuel is recovered. According to the transition herein, the same pressurization may be provided for the first fuel tank, condenser, and separator. Consequently, the recovery efficiency of the first fuel (high octane fuel) is improved.

The fuel supply device according to the embodiment may have a pressure sensor configured to measure the internal pressure of the condenser; and a storage amount sensor configured to measure the storage amount in the first storage unit, wherein the control device being configured to control operations of the flow adjustment mechanism, first switching mechanism, and vacuum pump, so that temporary transition from the primary-order state to the secondary-order state may be realized with a prerequisite that a first transition condition has been satisfied, temporary transition from the primary-order state to the tertiary-order state may be realized with a prerequisite that a second transition condition has been satisfied, temporary transition from the tertiary-order state to the quaternary-order state may be realized with a prerequisite that a third transition condition has been satisfied, and the first transition condition being a condition in which at least one of the conditions apply of the internal pressure of the condenser expressed by an output signal of the pressure sensor being at or above a predetermined first pressure, and a predetermined first executing time being passed from the time that the primary-order state is realized, the second transition condition being a condition in which at least one of the conditions apply of the storage amount of the first storage unit expressed by an output signal of the storage amount sensor being at or above a predetermined first storage amount, and a predetermined second executing time being passed from the time that the primary-order state is realized, and the third transition condition being a condition in which at least one of the conditions apply of the internal pressure of the condenser expressed by an output signal of the pressure sensor being at or above a predetermined second pressure, and a predetermined third executing time being passed from the time that the tertiary-order state is realized.

According to this configuration of the embodiment, in at least one of the cases of the case that the internal pressure of the condenser is at or above a first pressure or the case that a first executing time has passed from the time of transitioning to the primary-order state, the second fuel vapor passage is opened, whereby the state is transitioned to the secondary-order state, and the internal pressure of the condenser is recovered. Also, in at least one of the cases of the case that the storage amount in the first storage unit is at or above a first storage amount, and the case that a second executing time has passed from the time of transitioning to the primary-order state, the state is transitioned to a tertiary-order state, whereby the separator and condenser and first fuel tank have the same pressurization, and the separation processing is stopped. In at least one of the cases of the case that the internal pressure of the condenser is at or above a second pressure and the case that a third executing time has passed form the time of transitioning to the tertiary-order state, the state is transitioned to a quaternary-order state, whereby fuel recovery processing is started.

According to this configuration of the embodiment, as described above, separation recovery of the first fuel is performed based on a fixed determination standard, whereby the recovery efficiency of the first fuel (high octane fuel) is improved.

The flow adjusting mechanism according to the embodiment may have a second switching mechanism configured to switch the secondary-order recovery passage; and a delivery pump configured to suction the first fuel from the first storage unit and supply this to the first fuel tank; with the control device being configured to control the operations of the second switching mechanism and delivery pump.

According to this configuration of the embodiment, the flow adjustment mechanism is configured by a second switching mechanism and delivery pump, whereby the first fuel stored in the first storage unit is securely delivered to the first fuel tank, loss of recovery of the first fuel does not occur, and the recovery efficiency of the first fuel (high octane fuel) is improved.

The fuel supply device according to the embodiment may have a third switching mechanism configured to switch a passage that links the first fuel tank and a canister configured to adsorb fuel vapor that is generated by the vaporization of the first fuel; with the control device being configured to control the operations of the third switching mechanism.

According to this configuration of the embodiment, recovery is performed by the fuel vapor stored in the first fuel tank being adsorbed to the canister, whereby the recovery efficiency of the first fuel (high octane fuel) is improved.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel supply apparatus comprising:
    a material fuel tank to store a material fuel;
    a separator to separate the material fuel supplied from the material fuel tank into a first fuel and a second fuel, the first fuel containing a larger amount of high-octane component than an amount of high-octane component of the material fuel, the second fuel containing a larger amount of low-octane component than an amount of low-octane component of the material fuel;
    a condenser to condense the first fuel supplied from the separator through a primary-order recovery passage;
    a first fuel tank to store the first fuel supplied from the condenser through a secondary-order recovery passage;
    a first storage device provided in the secondary-order recovery passage to temporarily store the first fuel supplied from the condenser;
    a vacuum pump provided to a first fuel vapor passage linking the condenser and the first fuel tank to suction and supply fuel vapor generated by vaporization of the first fuel from the condenser to the first fuel tank;
    a control device configured to control operations of the vacuum pump; and
    a flow adjustment mechanism to adjust flow of the first fuel, downstream of the first storage device in the secondary-order recovery passage and upstream of the first fuel tank,
    wherein the control device is configured to control operations of the flow adjustment mechanism and the vacuum pump so that
        a primary-order state in which the first storage device and first fuel tank are shut off by the flow adjustment mechanism and in which the condenser is decompressed by operations of the vacuum pump, and
        a quaternary-order state in which the first storage device and first fuel tank are linked by the flow adjustment mechanism and in which decompression of the condenser of the vacuum pump is stopped,
    are realized in sequence.

2. The fuel supply apparatus according to claim 1, further comprising:
    a first switching mechanism to switch a second fuel vapor passage that branches from the first fuel vapor passage on an upstream side of the vacuum pump and connects to the first fuel tank,
    wherein the control device is configured to control operations of the flow adjustment mechanism, the first switching mechanism, and the vacuum pump so that
        the primary-order state further includes a state in which the second fuel vapor passage is closed by the first switching mechanism,
        the quaternary-order state further includes a state in which the second fuel vapor passage is opened by the first switching mechanism,
        a secondary-order state in which the first storage device and the first fuel tank are shut off by the flow adjustment mechanism, in which the second fuel vapor passage is opened by the first switching mechanism, and in which the condenser is decompressed by operations of the vacuum pump, is realized as a state temporarily transitioned from the primary-order state, and
        a tertiary-order state in which the first storage device and the first fuel tank are shut off by the flow adjustment mechanism, in which the second fuel vapor passage is opened by the first switching mechanism, and in which decompression of the condenser of the vacuum pump is stopped, is realized as an intermediate state between the primary-order state and the quaternary-order state.

3. The fuel supply apparatus according to claim 2, further comprising:

a pressure sensor configured to measure an internal pressure of the condenser; and a storage amount sensor configured to measure a storage amount in the first storage device, wherein the control device is configured to control operations of the flow adjustment mechanism, the first switching mechanism, and the vacuum pump so that temporary transition from the primary-order state to the secondary-order state is realized with a prerequisite that a first transition condition has been satisfied, temporary transition from the primary-order state to the tertiary-order state is realized with a prerequisite that a second transition condition has been satisfied, and temporary transition from the tertiary-order state to the quaternary-order state is realized with a prerequisite that a third transition condition has been satisfied, wherein the first transition condition includes at least one of a condition in which the internal pressure of the condenser expressed by an output signal of the pressure sensor is at or above a predetermined first pressure, and a condition in which a predetermined first executing time is passed from a timing at which the primary-order state is realized, wherein the second transition condition includes at least one of a condition in which the storage amount of the first storage device expressed by an output signal of the storage amount sensor is at or above a predetermined first storage amount, and a condition in which a predetermined second executing time is passed from a timing at which the primary-order state is realized, and wherein the third transition condition includes at least one of a condition in which the internal pressure of the condenser expressed by an output signal of the pressure sensor is at or above a predetermined second pressure, and a condition in which a predetermined third executing time is passed from a timing at which the tertiary-order state is realized.

4. The fuel supply apparatus according to claim 1, wherein the flow adjusting mechanism includes a second switching mechanism to switch the secondary-order passage, and a delivery pump to suction the first fuel from the first storage device to supply the first fuel to the first fuel tank, and wherein the control device is configured to control operations of each of the second switching mechanism and the delivery pump.

5. The fuel supply apparatus according to claim 4, further comprising:

a third switching mechanism to switch a passage that links the first fuel tank and a canister provided to adsorb fuel vapor that is generated by vaporization of the first fuel, wherein the control device is configured to control operations of the third switching mechanism.

* * * * *